US012592467B2

(12) United States Patent
Nguyen et al.

(10) Patent No.: US 12,592,467 B2
(45) Date of Patent: Mar. 31, 2026

(54) RESISTIVE STABILIZATION OF A TRANSMISSION LINE USING A GROUP OF CONDUCTIVE FILL COMPONENTS WHICH ARE ADJACENT TO AND SEPARATED FROM THE TRANSMISSION LINE

(71) Applicant: MACOM Technology Solutions Holdings, Inc., Lowell, MA (US)

(72) Inventors: Nguyen Nguyen, Lowell, MA (US); Trong Phan, Lowell, MA (US); Duy Nguyen, Lowell, CA (US); Thanh Pham, Lowell, CA (US); Stefano D'Agostino, Lowell, CA (US); Wayne Kennan, Lowell, CA (US); William Allen, Lowell, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 325 days.

(21) Appl. No.: 18/082,647

(22) Filed: Dec. 16, 2022

(65) Prior Publication Data

US 2024/0204382 A1 Jun. 20, 2024

(51) Int. Cl.

*H01P 3/08* (2006.01)
*H01P 5/08* (2006.01)
*H01P 11/00* (2006.01)

(52) U.S. Cl.

CPC .............. *H01P 3/082* (2013.01); *H01P 3/081* (2013.01); *H01P 5/08* (2013.01); *H01P 11/003* (2013.01)

(58) Field of Classification Search

CPC ............. H01P 5/081; H01P 3/082; H01P 5/08
USPC .......................................................... 333/246
See application file for complete search history.

(56) References Cited

U.S. PATENT DOCUMENTS

| | | | | |
|---|---|---|---|---|
| 6,621,373 B1 * | 9/2003 | Mullen et al. | H01P 1/227 | 333/81 A |
| 7,297,423 B2 * | 11/2007 | Mizuno et al. | H05K 1/0233 | 428/425.9 |
| 8,258,877 B2 | 9/2012 | Goel et al. | | |
| 11,012,033 B1 | 5/2021 | Nicholson | | |
| 2015/0070110 A1 * | 3/2015 | Ferrari et al. | H01P 3/082 | 333/238 |
| 2022/0400102 A1 | 12/2022 | Moon | | |

* cited by examiner

*Primary Examiner* — Benny T Lee
(74) *Attorney, Agent, or Firm* — Sheridan Ross P.C.

(57) ABSTRACT

An enhanced electrical circuit can employ conductive fill components that can facilitate providing desirable resistive stabilization of the electrical circuit and other desirable circuit qualities without having to use a physical resistor. The electrical circuit can comprise a transmission line, which can be a microstrip line, that can have defined dimensions. The electrical circuit can comprise respective conductive fill components that can be in proximity to desired sides of the transmission line, wherein the respective conductive fill components can provide the desired resistive stabilization for the electrical circuit. The respective conductive fill components can be separated from, and not in contact with, each other based on respective gaps of a defined size(s) between respective adjacent conductive fill components. The respective conductive fill components can be across a single layer or multiple layers of conductive fill components.

20 Claims, 9 Drawing Sheets

500

RESISTIVE STABILIZATION OF A TRANSMISSION LINE USING A GROUP OF CONDUCTIVE FILL COMPONENTS WHICH ARE ADJACENT TO AND SEPARATED FROM THE TRANSMISSION LINE

TECHNICAL FIELD

The subject disclosure relates generally to electronic circuitry, e.g., to lossy matching network and wideband stabilizer.

BACKGROUND

In many existing electrical devices, transmission lines, such as microstrip lines, can be utilized in an electrical circuit to send electrical signals between electrical components associated with (e.g., connected to) the transmission lines. Some existing electrical circuits, such as those circuits that employ a matching network (e.g., a matching network to facilitate matching input or output impedance of the electrical circuit or associated electrical device), can utilize low loss transmission lines, and can utilize physical resistors (e.g., physical poly resistors) to stabilize such electrical circuits. However, physical resistors can utilize an undesirable amount (e.g., an undesirably and relatively large amount) of space in the electrical circuit and also can undesirably (e.g., unwantedly or inefficiently) affect (e.g., negatively affect) the gain of the electrical circuit at a wide range of frequencies (e.g., from direct current frequency to higher or highest frequency).

The above-described description is merely intended to provide a contextual overview relating to current technology and is not intended to be exhaustive.

SUMMARY OF THE INVENTION

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a system that facilitates resistive stabilization of an electrical circuit. The system can comprise a transmission line having defined dimensions. The system also can comprise a group of conductive fill components in proximity to the transmission line, wherein the group of conductive fill components provides the resistive stabilization of the electrical circuit comprising the transmission line.

In certain embodiments, the disclosed subject matter can comprise a device that facilitates resistive stabilization of an electronic circuit. The device can include a conductive line having defined dimensions. The system also can comprise a group of conductive fill elements within a defined distance of the conductive line, wherein the group of conductive fill elements enables the resistive stabilization of the electronic circuit comprising the conductive line.

In still other embodiments, the disclosed subject matter can comprise a method that facilitates resistive stabilization of an electrical circuit. The method can comprise forming a transmission line having defined dimensions. The method also can comprise forming a group of conductive fill components in proximity to the transmission line, wherein the group of conductive fill components facilitates the resistive stabilization of the electrical circuit comprising the transmission line.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION OF THE INVENTION

Figure 1:
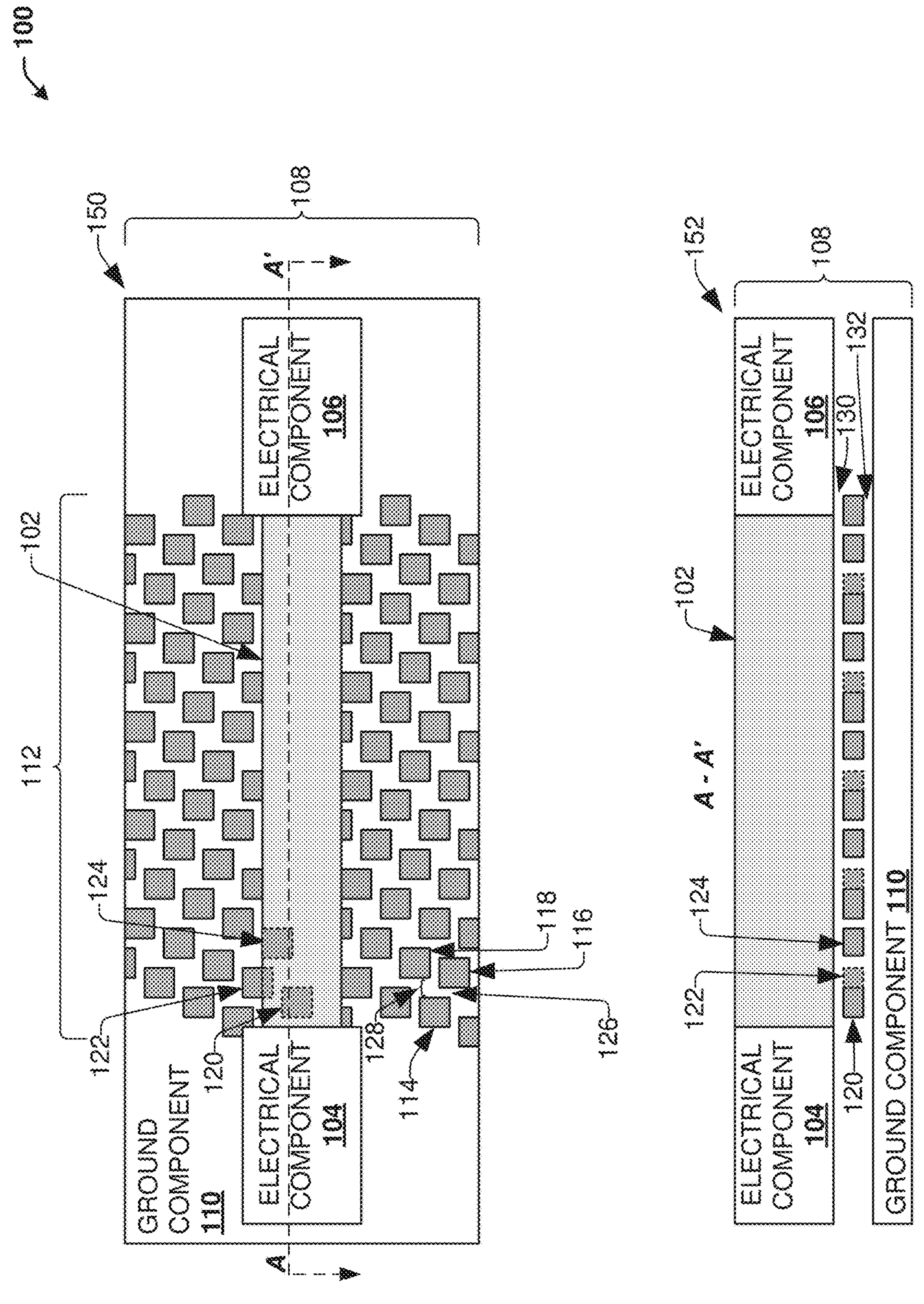
FIG. 1 illustrates a block diagram of a non-limiting example system that can employ conductive fill components that can desirably facilitate or provide resistive stabilization and other desirable circuit qualities or characteristics in an electrical circuit, comprising one or more transmission lines, without having to use a physical resistor in the electrical circuit, in accordance with various aspects and embodiments of the disclosed subject matter.

The disclosure herein is described with reference to the drawings, wherein like reference numerals are used to refer to like elements throughout the detailed description of the drawings. In the following description, for purposes of explanation, numerous specific details are set forth in order to provide a thorough understanding of the disclosed subject matter. It may be evident, however, that various disclosed aspects can be practiced without these specific details. In other instances, well-known structures and devices are shown in block diagram form in order to facilitate describing the disclosed subject matter.

In many existing electrical devices, transmission lines, such as microstrip lines, can be utilized in an electrical circuit to send electrical signals between electrical components associated with (e.g., connected to) the transmission lines. Many existing electrical circuits can employ a matching network to facilitate matching input or output impedance, or other characteristic(s), of the electrical circuit or associated electrical device to facilitate improving power transfer or reducing signal reflection (e.g., to improve or more efficiently transfer power from the source to the load associated with the electrical circuit). Existing matching networks of electrical circuits typically can utilize low loss transmission lines, and can utilize physical resistors (e.g., physical poly resistors) to stabilize the electrical circuit. However, physical resistors can utilize (e.g., require) an undesirable amount (e.g., an undesirably and relatively large amount) of space in the electrical circuit and also can undesirably (e.g., unwantedly or inefficiently) affect (e.g., negatively affect) the gain of the electrical circuit at a wide range (e.g., all) frequencies (e.g., from direct current frequency to higher or highest frequency).

The disclosed subject matter can overcome these and other deficiencies of existing electrical circuits generally, and in particular, of existing matching networks in existing electrical circuits.

In accordance with various embodiments, the disclosed subject matter can comprise an enhanced (e.g., improved) electrical circuit (e.g., electronic circuit) that can employ conductive fill components that can facilitate providing desirable (e.g., suitable, acceptable, enhanced, or optimal) resistive stabilization of the electrical circuit and other desirable circuit qualities or characteristics for the electrical circuit without having to use a physical resistor in the electrical circuit. The electrical circuit can comprise one or more transmission lines (e.g., one or more microstrip lines) that can have desired defined dimensions (e.g., dimensions on the order of micrometers, or other desired dimensions). In some embodiments, to facilitate (e.g., enable) or provide the desirable resistive stabilization of the electrical circuit and other desirable circuit qualities or characteristics of the electrical circuit, the electrical circuit can comprise a group of conductive fill components (e.g., dummy or resistor-emulating metal fill components) that can include respective conductive fill components that can be in proximity to (e.g., within a defined distance of) desired sides (e.g., left side, right side, and/or bottom side) of a transmission line, wherein the respective conductive fill components can provide the desired resistive stabilization and other desirable circuit qualities or characteristics for the electrical circuit. In certain embodiments, the respective conductive fill components can be separated from, and not in contact with, each other based at least in part on respective gaps of a defined size(s) between respective adjacent conductive fill components. In some embodiments, the respective conductive fill components can be formed across a single layer of conductive fill components or formed across multiple layers of conductive fill components (e.g., a first layer comprising a first subgroup or subarray of conductive fill components, a second layer comprising a second subgroup or subarray of conductive fill components, and/or another layer comprising another subgroup or subarray of conductive fill components). The size(s), shape(s), and/or other characteristic(s) associated with the group of conductive fill components can be determined or implemented in accordance with defined circuit design criteria (e.g., in accordance with one or more applicable design rule checks).

These and other aspects and embodiments of the disclosed subject matter will now be described with respect to the drawings.

FIG. 1 illustrates a block diagram of a non-limiting example system 100 that can employ conductive fill components that can desirably (e.g., suitably, acceptably, enhancedly, or optimally) facilitate or provide resistive stabilization and other desirable circuit qualities or characteristics in an electrical circuit, comprising one or more transmission lines, without having to use a physical resistor in the electrical circuit, in accordance with various aspects and embodiments of the disclosed subject matter. The system 100 can be part of, employed by, or associated with a device (e.g., an electrical or electronic device) that can perform desired electrical or electronic functions. The system 100 of FIG. 1 is illustrated by a top view 150 of the system 100 and a cross-sectional side view 152 (A-A') of the system 100.

For example, a device can comprise amplifiers, transistors, capacitors, inductors, voltage supply component(s), optical electronic component(s), and/or other electrical or electronic components that can be respectively arranged and/or connected to form an electrical circuit that can perform desired electrical or electronic functions. For instance, an electrical circuit can employ an amplifier that can receive input signals (e.g., electronic or electrical signals) and can amplify or otherwise process the input signals to generate output signals, wherein the amplifier device can have a gain that can range from unity to a desired gain that can be greater than unity (e.g., two times gain, three times gain, four times gain, or other desired gain). An amplifier and/or other type of electrical or electronic component can be utilized in a variety of different types of electronic devices, such as, for example, a communication device (e.g., a phone, a mobile phone, a computer, a laptop computer, an electronic pad or tablet, a television, an Internet Protocol television (IPTV), a set-top box, an electronic gaming device, electronic eyeglasses with communication functionality, an electronic watch with communication functionality, other electronic bodywear with communication functionality, or Internet of Things (IoT) devices), optical-related or solar-related devices (e.g., solar cells, communication devices, communication network devices, or other type of electronic device that can employ optical electronic technology; lighting-related devices (e.g., light emitting diode (LED) devices, laser-related devices; optical-related memory device; or other type of lighting-related device that can employ optical electronic technology), or other type of optical-related or solar-related device), vehicle-related electronic devices, appliances (e.g., refrigerator, oven, microwave oven, washer, dryer, or other type of appliance), audio equipment (e.g., stereo system, radio system, or other type of audio equipment), musical equipment (e.g., electric or electronic musical instruments, instrument amplifier, audio signal processor, or other type of musical equipment), or other type of electronic device that can utilize an amplifier and/or other type of electrical or electronic component to facilitate operation of the electronic device.

The system 100 can comprise one or more transmission lines, such as transmission line 102, that can be associated with (e.g., connected to), and utilized to transmit signals (e.g., electrical or electronic signals) between, electrical components, such as electrical components 104 and 106, in an electrical circuit 108 (e.g., electrical, electronic, and/or integrated circuit). It is to be appreciated and understood that, while two electrical components (e.g., 104 and 106) are depicted as being associated with (e.g., connected to) the transmission line 102 in the system 100 illustrated in FIG. 1, in certain embodiments, there can be more than two electrical components, or can be only one electrical component, associated with a transmission line, such as the transmission line 102. In some embodiments, one or more of the transmission lines (e.g., transmission line 102) can be a microstrip line (MLIN) that can have desired dimensions (e.g., desired length, width, and height or thickness), which can include a width of the microstrip line being on the order of micrometers (μm) (e.g., 10 μm, 100 μm, 500 μm, or other desired width greater than or less than 500 μm). In certain embodiments, the electrical circuit 108 can be or can comprise a matching network that can facilitate matching, or at least substantially matching input impedance or output impedance, or other characteristic(s) (e.g., input characteristic(s), output characteristic(s), or other characteristic(s)), of the electrical circuit 108 or associated electrical device to facilitate improving (e.g., increasing) power transfer or reducing (e.g., minimizing) signal reflection associated with the electrical circuit 108 (e.g., to improve or more efficiently transfer power from the source to the load associated with the electrical circuit 108).

The electrical circuit 108 can comprise a ground component 110 (e.g., a ground plane or node) that can be formed of a desired conductive (e.g., metal) material and can be part of a layer (e.g., ground plane layer) of the electrical circuit 108, which can comprise multiple layers (e.g., conductive layers, dielectric or insulator layers, or other layers) of respective materials, depending on the type of electrical circuit or device, and the type(s) of electrical or electronic functions that the electrical circuit 108 is to perform. The ground component 110 can be a conductive component that can provide a desired ground (e.g., desired ground reference) for the electrical circuit 108. The ground component 110 can have desired dimensions, which can vary depending on the type, configuration, or other characteristic(s) of the electrical circuit 108. In some embodiments, the ground component 110 can extend to each side (e.g., left and right sides) (and under) the transmission line 102 in the electrical circuit 108 (e.g., in an integrated circuit (IC) stack of layers of materials that can form the electrical circuit 108).

In accordance with various embodiments, to facilitate desirably (e.g., suitably, acceptably, enhancedly, or optimally) providing resistive stabilization and other desirable circuit qualities or characteristics in the electrical circuit 108, the system 100 can employ a group of conductive fill components 112 (e.g., dummy or resistor-emulating conductive or metal fill components) that can be formed on one or more layers (e.g., one or more conductive or metal layers) of the electrical circuit 108 (e.g., the IC stack of the electrical circuit 108), in accordance with (e.g., as desired, indicated, specified, or required by) the defined circuit design criteria (e.g., one or more design check rules that can be representative of and/or can facilitate implementation of the defined circuit design criteria). The defined circuit design criteria (e.g., the one or more design check rules) can comprise or relate to, for example, dimensions, shape, conductive material(s) utilized for the conductive fill components, and/or conductive properties of the conductive fill components, gaps (e.g., gap size or shape) between adjacent conductive fill components, a pattern associated with the conductive fill components (e.g., conductive fill components formed in a uniform or non-uniform pattern; and/or arrangement and location of the conductive fill components in relation to each other in an array of conductive fill components), and/or other desired characteristics (e.g., attributes or properties) associated with the conductive fill components.

The group of conductive fill components 112 can comprise a desired number of conductive fill components (e.g., conductive fill elements), which can include, for example, conductive fill component 114, conductive fill component 116, conductive fill component 118. The group of conductive fill components 112 can be located in proximity to (e.g., within a defined distance of) the transmission line 102. In some embodiments, the conductive fill components of the group of conductive fill components 112 can extend to each side (e.g., left and right sides) (and/or under or above) the transmission line 102, and/or the electrical component 104 and/or electrical component 106, in the electrical circuit 108. The defined distance can be on the order of micrometers, wherein the defined circuit design criteria can indicate or specify the defined distance between the transmission line 102 and the group of conductive fill components 112 that can achieve the desired (e.g., wanted, suitable, enhanced, or optimal) characteristics associated with the electrical circuit 108. In certain embodiments, the distance between the transmission line 102 and the group of conductive fill components 112 can be in a range of 3 μm to 20 μm, although, in other embodiments, the distance between the transmission line 102 and the group of conductive fill components 112 can be less than 3 μm or greater than 20 μm.

The group of conductive fill components 112 can be formed of a desired conductive material, and can be used in place of physical resistors in the electrical circuit 108 to facilitate providing resistive stabilization and other desirable circuit qualities or characteristics in the electrical circuit 108 without the electrical circuit 108 having to use a physical resistor in order to provide such resistive stabilization and other desirable circuit qualities or characteristics in the electrical circuit 108. For instance, the group of conductive fill components 112 can emulate certain desirable (e.g., wanted) attributes or qualities of physical resistors with respect to electrical circuits, such as resistive stabilization or other desired attributes or qualities with respect to electrical circuits, while also providing enhanced attributes or qualities for electrical circuits that physical resistors cannot provide, such as described herein. The conductive material of the group of conductive fill components 112 can be same as or different from the conductive material(s) utilized for the transmission line 102 and/or the ground component 110. The conductive material(s) (e.g., metal material(s) or other type of conductive material) utilized for the various components (e.g., transmission line 102, electrical component 104, electrical component 106, ground component 110, group of conductive fill components 112, and/or other component or circuitry) of the electrical circuit 108 can be virtually any desired type of conductive material(s) that can conduct electricity.

In some embodiments, the group of conductive fill components 112 can be formed in one or more layers (e.g., of the IC stack) that can be situated between the layer (e.g., of the IC stack) on which the ground component 110 is formed and the layer (e.g., of the IC stack) on which the transmission line 102 is formed. In other embodiments, some (or all) of the conductive fill components of the group of conductive fill components 112 can be formed in a layer(s) above the layer on which the transmission line 102 is formed such that the transmission line 102 can be situated between the ground component 110 and the layer(s) on which some (or all) of the conductive fill components of the group of conductive fill components 112 are formed. In other embodiments, additionally or alternatively, all or a portion of the group of conductive fill components 112 can be situated or formed on a same layer as the transmission line 102 in the IC stack, wherein such conductive fill components can be located on each side, or one side, of the transmission line 102 in proximity to (e.g., within a defined distance of) the transmission line 102.

In certain embodiments, the group of conductive fill components 112 can be or can comprise an array of conductive fill components (e.g., conductive fill component 114, conductive fill component 116, conductive fill component 118, conductive fill component 120, conductive fill component 122, conductive fill component 124, and/or other conductive fill component(s)), wherein such array of conductive fill components can be uniform or non-uniform in structure. In some embodiments, some of the conductive fill components (e.g., conductive fill component 120, conductive fill component 122, conductive fill component 124, and/or other conductive fill component(s)) of the group of conductive fill components 112 can be located (e.g., fully or partially situated, positioned, or located) under a bottom side (or above a top side) of the transmission line 102 in the IC stack for the electrical circuit 108. It is to be appreciated and understood that, for reasons of brevity and clarity, while some conductive fill components (e.g., conductive fill components 120, 122, and 124) that can be located under the transmission line 102 are shown in the top view 150 of the system 100, other conductive fill components that can be located under the transmission line 102 are not shown in the top view 150 of the system 100. If there is more than one layer of conductive fill components, the group of conductive fill components 112 can comprise a first subarray of conductive fill components, a second subarray of conductive fill components, and/or another subarray of conductive fill components that can be formed on respective layers (e.g., respective conductive layers of the IC stack) of the electrical circuit 108, wherein each layer of such layers can be uniform or non-uniform with respect to the layer itself and/or with respect to the other layer(s) of conductive fill components. For instance, with respect to a layer of conductive fill components, respective conductive fill components (e.g., conductive fill component 114, conductive fill component 116, conductive fill component 118, and/or other conductive fill component(s)) can be uniform or non-uniform (e.g., varied) in dimensions, shape, and/or other characteristic(s) (e.g., gap between adjacent conductive fill components) of or associated with the conductive fill components; and/or, with regard to conductive fill components of one layer with respect to other conductive fill components of another layer, first conductive fill components of a first layer can be uniform or non-uniform (e.g., varied) in dimensions, shape, and/or other characteristic(s) (e.g., gap between adjacent conductive fill components, pattern or arrangement of the first conductive fill components, and/or other characteristic) in relation to (e.g., as compared to) second conductive fill components of a second layer.

In a layer of conductive fill components, respective conductive fill components (e.g., conductive fill component 114 and conductive fill component 116, and/or conductive fill component 118), which can be adjacent to each other on the layer, can be separated from each other by a gap (e.g., a space) of a defined size between the first conductive fill component (e.g., 114) and the second conductive fill component (e.g., 116), wherein the first conductive fill component and the second conductive fill component can be formed such that these respective conductive fill components are not in contact with each other. In some embodiments, the respective conductive fill elements can be formed in an array (e.g., a staggered array) such that there can be a first gap 126 of a first size (e.g., length or distance) between a side of the first conductive fill component (e.g., 114) and a side of the second conductive fill component (e.g., 116), and a second gap 128 of a second size between the side of the first conductive fill component (e.g., 114) and a side of a third conductive fill component (e.g., 118).

The arrangement or pattern of the respective conductive fill components of the group of conductive fill components 112 in the electrical circuit 108, the respective size(s) of the respective conductive fill components, the respective proximities of the respective fill components to the transmission line 102, and/or other characteristics associated with the respective conductive fill components, such as described herein, can influence, impact, or determine the level of resistive stabilization and other desirable circuit qualities or characteristics associated with the electrical circuit 108 (e.g., inductance-related characteristics, resistance-related characteristics, capacitance-related characteristics, DC gain-related characteristics, electrical circuit layout or space utilization characteristics, and/or other characteristics associated with the electrical circuit 108), such as described herein. For instance, with regard to a first potential version of the electrical circuit 108, a first arrangement or pattern of the respective conductive fill components of the group of conductive fill components 112 in the electrical circuit 108, a first respective size(s) of the respective conductive fill components, first respective proximities of the respective fill components to the transmission line 102, and/or other first characteristics associated with the respective fill components can provide a first resistive stabilization quality or characteristic (e.g., a first level of resistive stabilization or other first resistive stabilization quality or characteristic) and/or other first circuit qualities or characteristics associated with the electrical circuit 108 (e.g., first inductance-related characteristics, first resistance-related characteristics, first capacitance-related characteristics, first DC gain-related characteristics, first electrical circuit layout or space utilization characteristics, and/or other first characteristics associated with the electrical circuit 108). In contrast, with regard to a second potential version of the electrical circuit 108, a second arrangement or pattern of the respective conductive fill components of the group of conductive fill components 112 in the electrical circuit 108, a second respective size(s) of the respective conductive fill components, second respective proximities of the respective fill components to the transmission line 102, and/or other second characteristics associated with the respective fill components can provide a second resistive stabilization quality or characteristic (e.g., a second level of resistive stabilization or other second resistive stabilization quality or characteristic) and/or other second circuit qualities or characteristics associated with the electrical circuit 108 (e.g., second inductance-related characteristics, second resistance-related characteristics, second capacitance-related characteristics, second DC gain-related characteristics, second electrical circuit layout or space utilization characteristics, and/or other second characteristics associated with the electrical circuit 108).

In accordance with various embodiments, in a region 130 between the transmission line 102 and the group of conductive fill components 112, or portion of the group of conductive fill components (e.g., portion of conductive fill components on a layer(s) of the IC stack), one or more layers of one or more types of dielectric materials can be placed (e.g., situated) or deposited; and/or in a region 132 between the ground component 110 and the group of conductive fill components 112, or portion of the group of conductive fill components (e.g., portion of conductive fill components on a layer(s) of the IC stack), one or more layers of one or more types of dielectric materials can be placed or deposited; and/or one or more types of dielectric materials can be placed or deposited in the gaps (e.g., first gap 126 and/or second gap 128) between adjacent conductive fill components (e.g., first conductive fill component 114 and second conductive fill component 116, and/or second conductive fill component 116 and third conductive fill component 118). The one or more types of dielectric materials can have respective dielectric constants, and a layer of dielectric material can have desired dimensions, including a thickness or height (e.g., in each of the region 130 and/or region 132) on the order of micrometers. The dielectric material(s) can be virtually any kind of desired dielectric material that can act as an electrical insulator and provide desirable dielectric polarization. In certain embodiments, some or all of the gaps (e.g., first gap 126 and/or second gap 128) between adjacent conductive fill components (e.g., first conductive fill component 114 and second conductive fill component 116, and/or second conductive fill component 116 and third conductive fill component 118) can be air gaps, instead of having a dielectric material placed in such gaps, and/or a portion(s) of the region 130 and/or region 132 can comprise an air gap(s), instead of a dielectric material. It is to be appreciated and understood that, for reasons of brevity and clarity, the dielectric or insulator layer(s) or material(s), other conductive layer(s) or material(s), and/or other electrical component(s), which may be part of the electrical circuit 108, are not explicitly shown in the system 100 of FIG. 1.

Figure 2:
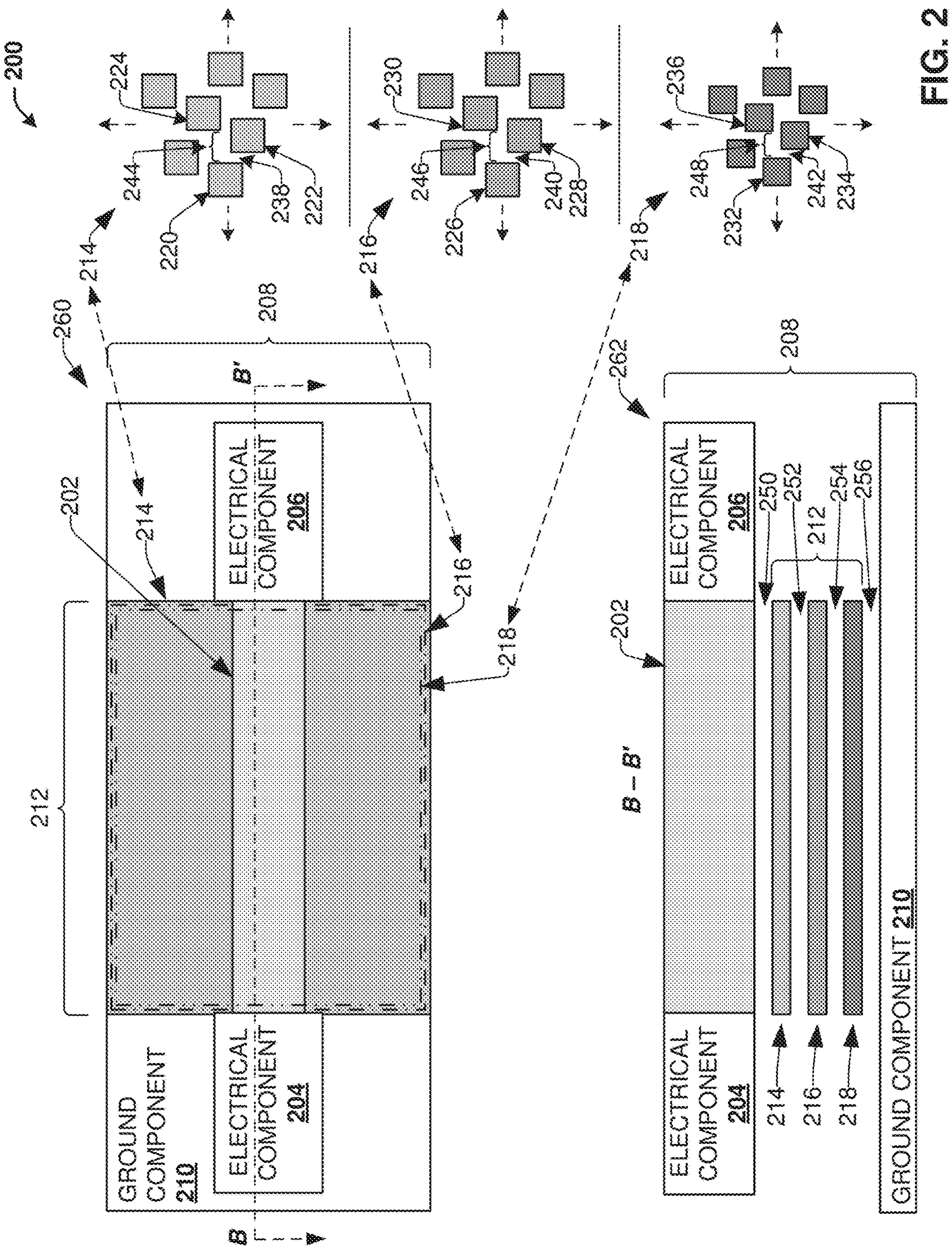
FIG. 2 depicts a non-limiting exemplary block diagram of a non-limiting example system that can employ conductive fill components, across multiple layers of an electrical circuit (e.g., of an integrated circuit (IC) stack of layers of the electrical circuit), where the conductive fill components can desirably facilitate or provide resistive stabilization and other desirable circuit qualities or characteristics in an electrical circuit, comprising one or more transmission lines, without having to use a physical resistor in the electrical circuit, in accordance with various aspects and embodiments of the disclosed subject matter.

Referring to FIG. 2, FIG. 2 depicts a non-limiting exemplary block diagram of a non-limiting example system 200 that can employ conductive fill components, across multiple layers of an electrical circuit (e.g., of an IC stack of layers of the electrical circuit), where the conductive fill components can desirably (e.g., suitably, acceptably, enhancedly, or optimally) facilitate or provide resistive stabilization and other desirable circuit qualities or characteristics in an electrical circuit, comprising one or more transmission lines, without having to use a physical resistor in the electrical circuit, in accordance with various aspects and embodiments of the disclosed subject matter. The system 200 can be part of, employed by, or associated with a device (e.g., an electrical or electronic device) that can perform desired electrical or electronic functions, such as described herein. FIG. 2 is depicted by a top view 260 of the system 200 and a cross-sectional side view 262 (B-B') of the system 200.

The system 200 can comprise one or more transmission lines, such as transmission line 202, that can be associated with (e.g., connected to), and utilized to transmit signals (e.g., electrical or electronic signals) between, electrical components, such as electrical components 204 and 206, in an electrical circuit 208 (e.g., electrical, electronic, and/or integrated circuit). It is to be appreciated and understood that, while two electrical components (e.g., 204 and 206) are depicted as being associated with (e.g., connected to) the transmission line 202 in the system 200 illustrated in FIG. 2, in certain embodiments, there can be more than two electrical components, or can be only one electrical component, associated with a transmission line, such as the transmission line 202. In some embodiments, one or more of the transmission lines (e.g., transmission line 202) can be an MLIN that can have desired dimensions. For instance, the width of the transmission line 202 can be on the order of micrometers, such as described herein. In certain embodiments, the electrical circuit 208 can be or can comprise a matching network that can facilitate matching, or at least substantially matching input impedance or output impedance, or other characteristic(s), of the electrical circuit 208 or associated electrical device to facilitate improving (e.g., increasing) power transfer or reducing (e.g., minimizing) signal reflection associated with the electrical circuit 208.

The electrical circuit 208 can comprise a ground component 210 (e.g., a ground plane or node) that can be formed of a desired conductive (e.g., metal) material and can be part of a lower or bottom layer (e.g., ground plane layer) of the electrical circuit 208 that can be formed on a substrate component (not shown) of the system 200, wherein the electrical circuit 208 can be formed, fabricated, or created using multiple layers (e.g., conductive layers, dielectric or insulator layers, or other layers) of respective materials that can be respectively configured or patterned to form respective components of the electrical circuit 208, depending on the type of electrical circuit or device, and the type(s) of electrical or electronic functions that the electrical circuit 208 is to perform. The ground component 210 can be a conductive component that can provide a desired ground (e.g., desired ground reference) for the electrical circuit 208. The ground component 210 can have desired dimensions, which can vary depending on the type, configuration, or other characteristic(s) of the electrical circuit 208. In some embodiments, the ground component 210 can extend to each side (e.g., left and right sides) (and under) the transmission line 202 in the IC stack of layers of materials that can form the electrical circuit 208.

In accordance with various embodiments, to facilitate desirably (e.g., suitably, acceptably, enhancedly, or optimally) providing resistive stabilization and other desirable circuit qualities or characteristics in the electrical circuit 208, the system 200 can employ a group of conductive fill components 212 (e.g., dummy or resistor-emulating conductive or metal fill components) that can be formed on multiple layers (e.g., two or more conductive or metal layers) of the IC stack of the electrical circuit 208) in proximity to (e.g., within a defined distance of) the transmission line 202, wherein respective layers of conductive fill components can have respective characteristics (e.g., respective dimensions, patterns, conductive materials, proximities to the transmission line 202, or other characteristics), in accordance with (e.g., as desired, indicated, specified, or required by) the defined circuit design criteria (e.g., one or more design check rules that can be representative of and/or can facilitate implementation of the defined circuit design criteria), such as described herein.

In some embodiments, the group of conductive fill components 212 can comprise a first subgroup (e.g., a first layer or first subarray) of conductive fill components 214, a second subgroup (e.g., a second layer or second subarray) of conductive fill components 216, and a third subgroup (e.g., a third layer or third subarray) of conductive fill components 218, such as depicted in the system 200 of FIG. 2. The defined distance between the transmission line 202 and the group of conductive fill components 212 can be on the order of micrometers, wherein the defined circuit design criteria can indicate or specify the defined distance between the transmission line 202 and the group of conductive fill components 212 that can achieve the desired (e.g., wanted, suitable, enhanced, or optimal) characteristics associated with the electrical circuit 208. In some embodiments, the distance between the transmission line 202 and the first subgroup of conductive fill components 214 can be in a range of 3 μm to 20 μm, although, in other embodiments, the distance between the transmission line 202 and the first subgroup of conductive fill components 214 can be less than 3 μm or greater than 20 μm. The respective distances between the respective subgroups of conductive fill components (e.g., 214, 216, 218) also can be on the order of micrometers, in accordance with (e.g., in compliance with; and/or as indicated, specified, or defined by) the defined circuit design criteria. It is to be appreciated and understood that, in other embodiments, the group of conductive fill components can be formed on less than three layers or more than three layers of the IC stack, as desired, for example, when such design of the group of conductive fill components is in accordance with the defined circuit design criteria.

The first subgroup of conductive fill components 214 can comprise, for example, conductive fill component 220, conductive fill component 222, conductive fill component 224, and/or other conductive fill component(s)), which can have first characteristics (e.g., first conductive fill component characteristics), including with regard to such types of characteristics of conductive fill components as described herein. The second subgroup of conductive fill components 216 can comprise, for example, conductive fill component 226, conductive fill component 228, conductive fill component 230, and/or other conductive fill component(s)), which can have second characteristics (e.g., second conductive fill component characteristics). The third subgroup of conductive fill components 218 can comprise, for example, conductive fill component 232, conductive fill component 234, conductive fill component 236, and/or other conductive fill component(s)), which can have third characteristics (e.g., third conductive fill component characteristics). Respective characteristics of the first characteristics, the second characteristics, and/or the third characteristics can be same as or similar to each other, or can be different from each other (e.g., some of the respective characteristics can be the same or substantially the same for the first characteristics, the second characteristics, and/or the third characteristics; and/or some of the respective characteristics of the first characteristics, the second characteristics, and/or the third characteristics can be different from corresponding characteristics of the other of the first characteristics, the second characteristics, and/or the third characteristics). For instance, first dimensions, first shapes, first gaps between adjacent conductive fill components, and/or a first pattern of the first subgroup of conductive fill components 214 respectively can be same as, or different from, second dimensions, second shapes, second gaps between adjacent conductive fill components, and/or a second pattern of the second subgroup of conductive fill components 216, and/or respectively can be same as, or different from, third dimensions, third shapes, third gaps between adjacent conductive fill components, and/or a third pattern of the third subgroup of conductive fill components 218. In accordance with various embodiments, the respective conductive fill components of a subgroup of conductive fill components (e.g., 214, 216, or 218) on a layer of the IC stack of the system 200 can be uniform or non-uniform with respect to each other; and/or conductive fill components of one subgroup of conductive fill components (e.g., 214) on one layer of the IC stack of the system 200 can be uniform or non-uniform with respect to other conductive fill components of another subgroup of conductive fill components (e.g., 216 or 218).

In a layer (e.g., first layer, second layer, or third layer) of conductive fill components, respective conductive fill components (e.g., conductive fill component 220 and conductive fill component 222, and/or conductive fill component 224; conductive fill component 226 and conductive fill component 228, and/or conductive fill component 230; conductive fill component 232 and conductive fill component 234, and/or conductive fill component 236), which can be adjacent to each other on the layer, can be separated from each other by a gap (e.g., a space) of a defined size (e.g., respective defined sizes for respective conductive fill components of respective subgroups) between the first conductive fill component (e.g., 220; 226; or 230) of the layer and the second conductive fill component (e.g., 222; 228; or 232) of the layer, wherein the first conductive fill component and the second conductive fill component can be formed such that these respective conductive fill components are not in contact with each other. In some embodiments, the respective conductive fill components (e.g., conductive fill elements) can be formed in an array or subarray (e.g., a staggered array or subarray) such that there can be a first gap (e.g., 238; 240; or 242, respectively) of a first size (e.g., respective first sizes, lengths, or distances for respective layers) between a side of the first conductive fill component (e.g., 220; 226; or 230) and a side of the second conductive fill component (e.g., 222; 228; or 232), and a second gap (e.g., 244; 246; or 248, respectively) of a second size (e.g., respective second sizes, lengths, or distances for respective layers) between the side of the first conductive fill component (e.g., 220; 226; or 230) and a side of a third conductive fill component (e.g., 224; 230; or 236).

The arrangement or pattern of the respective conductive fill components of the respective subgroups of conductive fill components 214, 216, and/or 218 in the electrical circuit 208, the respective size(s) of the respective conductive fill components, the respective proximities of the respective fill components to the transmission line 202, and/or other characteristics associated with the respective conductive fill components, such as described herein, can influence, impact, or determine the level of resistive stabilization and other desirable circuit qualities or characteristics associated with the electrical circuit 208 (e.g., inductance-related characteristics, resistance-related characteristics, capacitance-related characteristics, DC gain-related characteristics, electrical circuit layout or space utilization characteristics, and/or other characteristics associated with the electrical circuit 208), such as described herein.

In accordance with various embodiments, in a region 250 between the transmission line 202 and the first subgroup of conductive fill components 214, one or more layers of one or more types of dielectric materials can be placed or deposited; in a region 252 between the first subgroup of conductive fill components 214 and the second subgroup of conductive fill components 216, one or more layers of one or more types of dielectric materials can be placed or deposited; in a region 254 between the second subgroup of conductive fill components 216 and the third subgroup of conductive fill components 218, one or more layers of one or more types of dielectric materials can be placed or deposited; and/or in a region 256 between the ground component 110 and the third subgroup of conductive fill components 218, one or more layers of one or more types of dielectric materials can be placed or deposited; and/or one or more types of dielectric materials can be placed or deposited in the gaps (e.g., 238, 240, and/or 242; and/or 244, 246, and/or 248) between adjacent conductive fill components (e.g., 220 and 222, 226 and 228, and/or 232 and 234; and/or 220 and 224, 226 and 230, and/or 232 and 236) in a layer. The one or more types of dielectric materials can have respective dielectric constants, and a layer of dielectric material can have desired dimensions, including a thickness or height (e.g., in each of the regions 250, 252, 254, and/or 256) on the order of micrometers. In some embodiments, the region 250 between the transmission line 202 and the first subgroup of conductive fill components 214 can span a distance in a range of 3 μm to 20 μm, although, in other embodiments, the region 250 between the transmission line 202 and the first subgroup of conductive fill components 214 can span a distance less than 3 μm or greater than 20 μm. The dielectric material(s) can be virtually any kind of desired dielectric material that can act as an electrical insulator and provide desirable dielectric polarization. In certain embodiments, some or all of the gaps (e.g., 238, 240, and/or 242; and/or 244, 246, and/or 248) between adjacent conductive fill components (e.g., 220 and 222, 226 and 228, and/or 232 and 234; and/or 220 and 224, 226 and 230, and/or 232 and 236) can be air gaps, instead of having a dielectric material placed in such gaps, and/or a portion(s) of the region 250, region 252, region 254, and/or region 256 can comprise an air gap(s), instead of a dielectric material. It is to be appreciated and understood that, for reasons of brevity and clarity, a dielectric or insulator layer(s) or material(s), other conductive layer(s) or material(s), and/or other electrical component(s), which may be part of the electrical circuit 208, are not explicitly shown in the system 200 of FIG. 2.

It is to be appreciated and understood that, while various embodiments described herein (e.g., with regard to the system 100 of FIG. 1 or the system 200 of FIG. 2, or otherwise described herein) relate to conductive fill components being located in proximity to transmission lines, in certain embodiments, additionally or alternatively, conductive fill components can be designed, and can be formed, structured, or situated (e.g., fabricated, created, or located) in proximity to (e.g., within a defined distance of) another electrical or electronic component(s) (e.g., electrical components 104 and/or 106 of FIG. 1, electrical components 204 and/or 206 of FIG. 2, and/or another electrical or electronic component(s)) of an electrical circuit (e.g., electrical circuit 108 of FIG. 1 or electrical circuit 208 of FIG. 2), to facilitate modifying, adjusting, tailoring, customizing, or altering one or more characteristics (e.g., one or more attributes or properties) associated with the other electrical or electronic component(s) and/or the electrical circuit overall, in accordance with the defined circuit design criteria. For instance, based at least in part on the design of and the characteristics associated with conductive fill components located in proximity to a particular electrical or electronic component in an electrical circuit, the characteristics associated with that particular electrical or electronic component and/or the electrical circuit overall can be modified, adjusted, tailored, customized, or altered to achieve desirable (e.g., wanted, acceptable, enhanced, or optimal) characteristics associated with that particular electrical or electronic component and/or the electrical circuit, in accordance with the defined circuit design criteria. Such electrical or electronic component(s) can be or can comprise, for example, an optical electronic component, an amplifier, a resonator, an oscillator, a transistor, a switch, a capacitor, an inductor, a resistor, a diode, or other type of electrical or electronic component.

The systems described herein, including the system 100 and system 200, employing the group of conductive fill components (e.g., group 112 of FIG. 1 or group 212 of FIG. 2) in the electrical circuit (e.g., electrical circuit 108 or electrical circuit 208), can desirably (e.g., suitably, acceptably, enhancedly, or optimally) facilitate or provide a desired level of resistive stabilization or other desired resistive stabilization qualities for the electrical circuit and other desirable circuit qualities or characteristics for the electrical circuit without having to use physical resistors (e.g., physical poly resistors) in the electrical circuit in order to stabilize the electrical circuit. For example, the system (e.g., system 100 or system 200), employing the group of conductive fill components (e.g., group 112 or group 212) in the electrical circuit (e.g., electrical circuit 108 or electrical circuit 208), can provide a desirable lossy wideband matching network and stabilizer (e.g., resistive stabilizer) for the electrical circuit. The electrical circuit (e.g., electrical circuit 108 or electrical circuit 208) can be stabilized over a desirably wide bandwidth while maintaining desirably good matching and low-frequency gain.

In the electrical circuit (e.g., electrical circuit 108 or electrical circuit 208), employing the group of conductive fill components (e.g., group 112 or group 212) can enable the inductance associated with the electrical circuit to remain the same or at least substantially the same over a wide range of frequencies; series resistance of the electrical circuit can be the same or substantially the same across a range of low frequencies, and, at higher frequencies (e.g., frequencies above the range of low frequencies), the series resistance of the electrical circuit can increase as a function of an increase in frequency; and across the range of all relevant frequencies, capacitance associated with the electrical circuit can increase as a function of an increase in frequency. Also, the electrical circuit (e.g., electrical circuit 108 or electrical circuit 208), employing the group of conductive fill components (e.g., group 112 or group 212), can become lossier at relatively higher frequencies while the inductance value associated with the electrical circuit can remain relatively or substantially constant across a wide range of frequencies, including the higher frequencies, which desirably can enable the electrical circuit to be more stable (e.g., at higher frequencies, the electrical circuit can be lossier, and, as a result, more stable). At lower frequencies, the electrical circuit (e.g., electrical circuit 108 or electrical circuit 208) can have less loss, and can thereby desirably maintain gain at lower frequencies.

The system (e.g., system 100 or system 200), employing the group of conductive fill components (e.g., group 112 or group 212) in the electrical circuit (e.g., electrical circuit 108 or electrical circuit 208) without having to utilize physical resistors (e.g., to provide resistive stabilization for the electrical circuit), can desirably satisfy density specifications (e.g., density requirements or standards) in the silicon process, and desirably can have a high level of repeatability, and thus, can have a high level of reliability. For example, the system (e.g., system 100 or system 200), by employing the group of conductive fill components (e.g., group 112 or group 212) in the electrical circuit (e.g., electrical circuit 108 or electrical circuit 208) without having to utilize physical resistors, can reduce (e.g., decrease) the amount of space utilized to form the electrical circuit having the desirable resistive stabilization qualities or characteristics and/or other desirable electrical circuit qualities or characteristics (e.g., such as disclosed or indicated herein) and/or increase the density of electrical components in the electrical circuit, as compared to existing electrical circuits that utilize physical resistors for resistive stabilization of the existing electrical circuits. Further, in addition to saving (e.g., reducing or preserving) space utilized to form the electrical circuit, employing the conductive fill components in the electrical circuit, in place of physical resistors, the electrical circuit fabrication process desirably can be metal mask changeable, which can facilitate or enable the electrical circuit fabrication process to be more efficient (e.g., more cost efficient, more time efficient, more resource efficient, and/or otherwise more efficient) than existing processes.

Also, as desired, the system (e.g., system 100 or system 200), employing the group of conductive fill components (e.g., group 112 or group 212) in the electrical circuit (e.g., electrical circuit 108 or electrical circuit 208), can be utilized as a de-quality factor (de-Q) technique at high frequencies (e.g., only at high frequencies) to avoid gain ripples (e.g., by dissipating power and reducing the Q factor associated with the electrical circuit).

Figure 3:
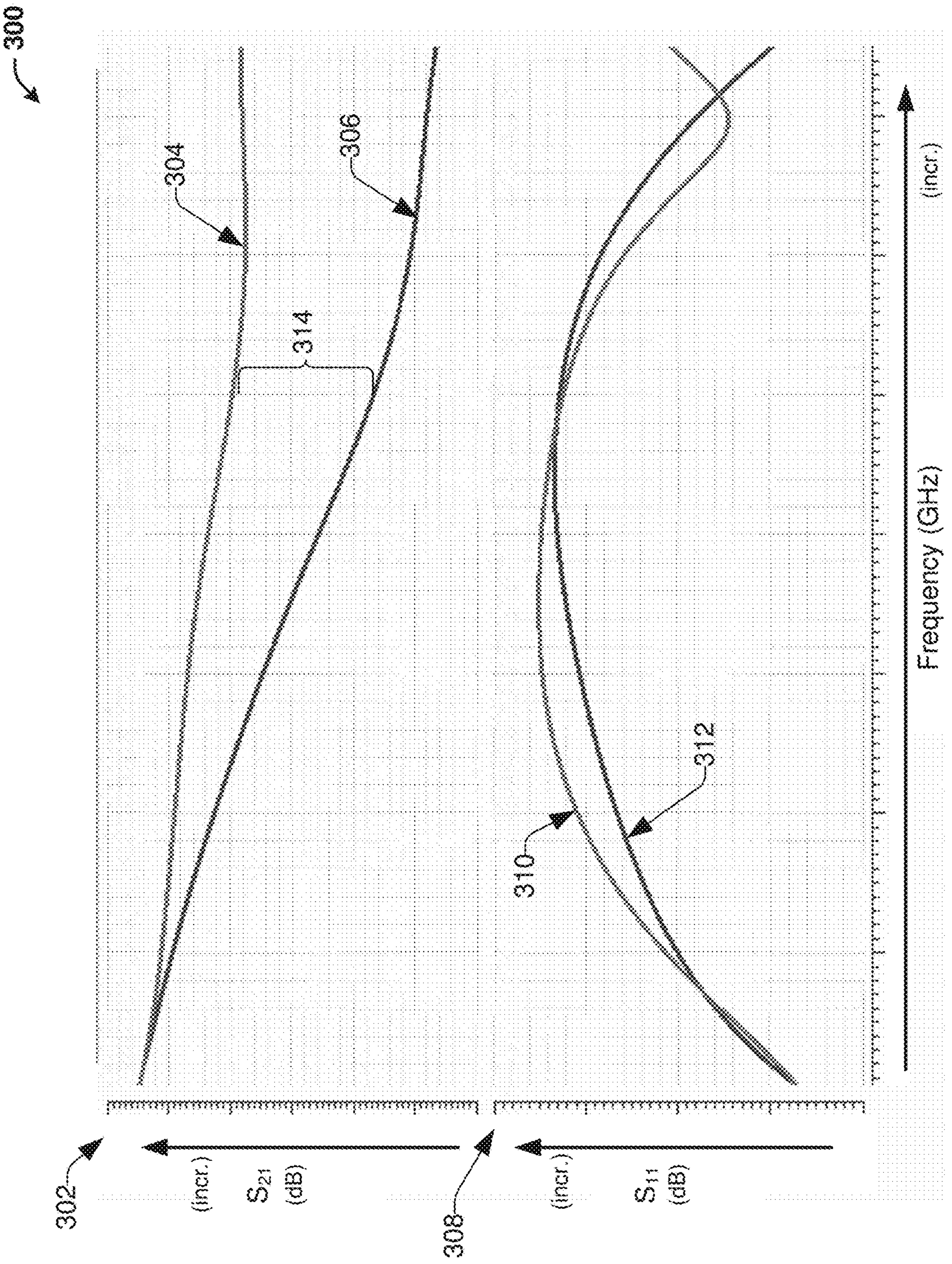
FIG. 3 illustrates a diagram of non-limiting exemplary graphs of experimental results (e.g., experimental electromagnetic (EM) simulation results) relating to employing conductive fill components with a transmission line (e.g., MLIN) in an electrical circuit, in accordance with various aspects and embodiments of the disclosed subject matter.

Referring to FIG. 3, FIG. 3 illustrates a diagram of non-limiting exemplary graphs 300 of experimental results (e.g., experimental electromagnetic (EM) simulation results) relating to employing conductive fill components with (e.g., in proximity to) a transmission line (e.g., MLIN) in an electrical circuit, in accordance with various aspects and embodiments of the disclosed subject matter. The example transmission line is a 500 μm, 50 ohm, metal MLIN.

The exemplary graphs 300 present plots of data points illustrating decibel (dB) values for $S_{21}$ (transmission parameter or coefficient, which can represent the ratio of the power transferred from port 1 (input from drive signal) to port 2 (output) of the electrical circuit) and $S_{11}$ (reflection parameter or coefficient, which can represent the ratio of the reflection of port 1 to the drive signal at port 1) (along the y-axis) as a function of frequency (in gigahertz (GHz)) (along the x-axis). The exemplary graphs 300 comprise graph 302 that presents a first plot of data points 304 of $S_{21}$ values as a function of frequency with regard to an example electrical circuit with no conductive fill components; and a second plot of data points 306 of $S_{21}$ values as a function of frequency with regard to another example electrical circuit employing conductive fill components in proximity to the transmission line (e.g., with the other electrical circuit not containing physical resistors for resistive stabilization of the other electrical circuit). As depicted in the graph 302, the $S_{21}$ values (in dB) can be increasing (incr.) along the y-axis as the y-axis proceeds away from the x-axis, and the frequency can be increasing (incr.) along the x-axis as the x-axis proceeds away from the y-axis.

The exemplary graphs 300 also comprise graph 308 that presents a third plot of data points 310 of $S_{11}$ values (in dB) as a function of frequency with regard to the example electrical circuit with no conductive fill components; and a fourth plot of data points 312 of $S_{11}$ values as a function of frequency with regard to the other example electrical circuit employing the conductive fill components in proximity to the transmission line. As depicted in the graph 308, the $S_{11}$ values (in dB) can be increasing (incr.) along the y-axis as the y-axis proceeds away from the x-axis, and the frequency can be increasing (incr.) along the x-axis as the x-axis proceeds away from the y-axis.

As can be observed from the exemplary graph 308, $S_{11}$ for the other example electrical circuit employing the conductive fill components in proximity to the transmission line can remain desirable (e.g., substantially good, acceptable, or excellent), as the fourth plot of data points 312 is substantially consistent with the third plot of data points 310. As also can be observed from the exemplary graph 302, with regard to $S_{21}$, when comparing the first plot of data points 304 and the second plot of data points 306, the other example electrical circuit, which employs conductive fill components in proximity to the transmission line, can be desirably lossier by a certain amount (e.g., 0.6 dB or other desirable (e.g., higher) amount) at higher frequencies (e.g., 100 GHz or other relatively higher frequency), as compared to the example electrical circuit that does not contain conductive fill components (as indicated at reference numeral 314).

Figure 4:
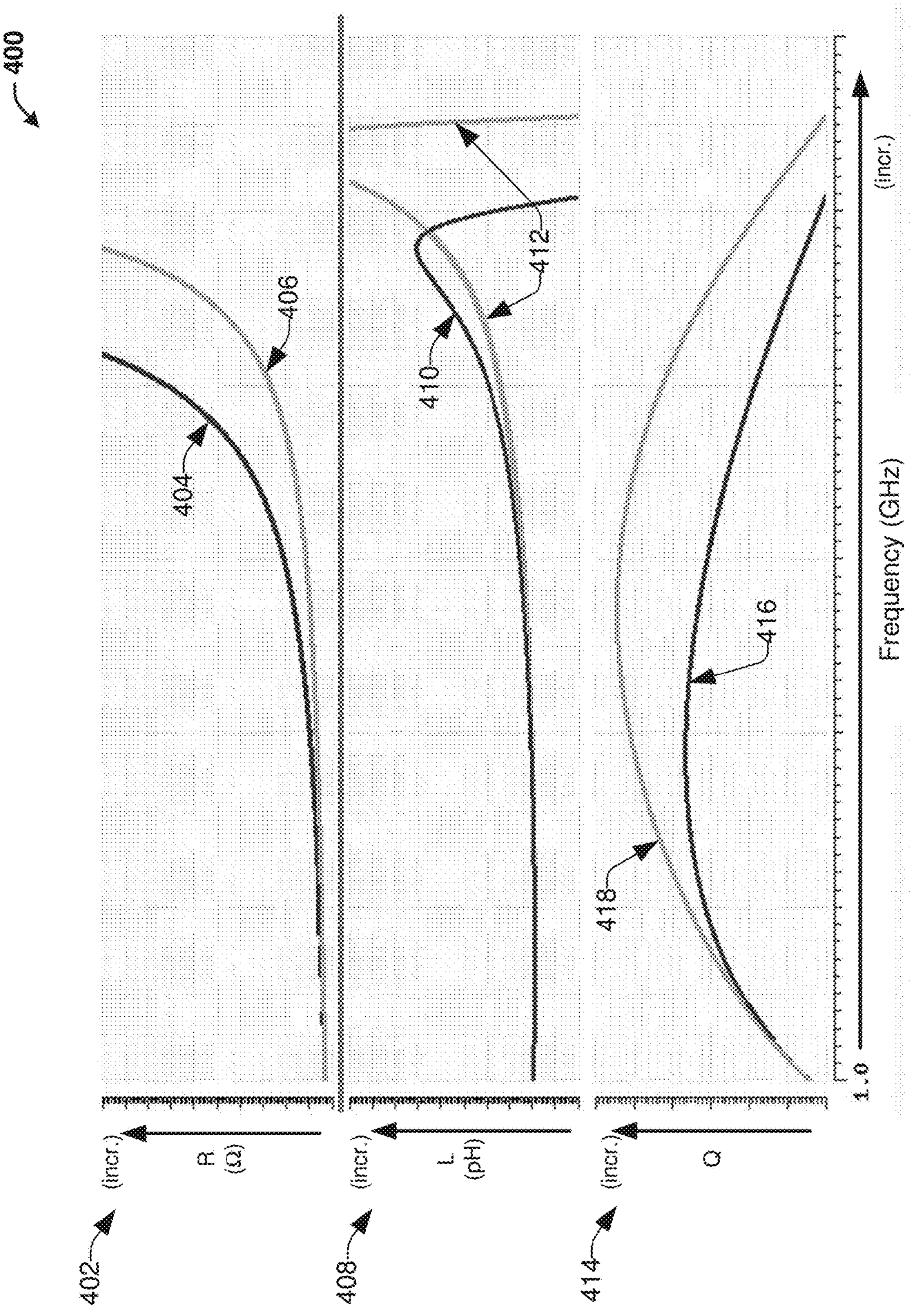
FIG. 4 depicts a diagram of non-limiting exemplary graphs of experimental results (e.g., EM simulation results) relating to resistance, inductance, and quality (Q) factor in connection with employing conductive fill components with a transmission line (e.g., MLIN) in an electrical circuit, wherein the conductive fill components can provide desirable inductance for the electrical circuit, in accordance with various aspects and embodiments of the disclosed subject matter.

Turning briefly to FIG. 4, FIG. 4 depicts a diagram of non-limiting exemplary graphs 400 of experimental results (e.g., EM simulation results) relating to resistance, inductance, and Q factor in connection with employing conductive fill components with (e.g., in proximity to) a transmission line (e.g., MLIN) in an electrical circuit, wherein the conductive fill components can provide desirable (e.g., suitable, enhanced, or optimal) inductance for the electrical circuit (e.g., without the electrical circuit containing physical resistors for resistive stabilization of the electrical circuit), in accordance with various aspects and embodiments of the disclosed subject matter. The example transmission line is a 500 μm, 50 ohm, metal MLIN.

The exemplary graphs 400 include a graph 402 that presents a first plot of data points 404 of series resistance (R) (in ohms Ω) (along the y-axis) of an example electrical circuit, which has conductive fill components in proximity to the transmission line (e.g., with the electrical circuit not containing physical resistors for resistive stabilization of the electrical circuit), as a function of frequency (in GHZ) (along the x-axis); and a second plot of data points 406 of series resistance of another example electrical circuit, which contains no conductive fill components, as a function of frequency. As depicted in the graph 402, the resistance values can be increasing (incr.) along the y-axis as y-axis proceeds away from the x-axis, and the frequency can be increasing (incr.) along the x-axis as the x-axis proceeds away from the y-axis.

The exemplary graphs 400 also comprise a graph 408 that presents a third plot of data points 410 of inductance (L in pH) (along the y-axis) of the electrical circuit, which has conductive fill components in proximity to the transmission line, as a function of frequency (along the x-axis); and a fourth plot of data points 412 of inductance of the other example electrical circuit, which contains no conductive fill components, as a function of frequency. As depicted in the graph 408, the inductance values can be increasing (incr.) along the y-axis as the y-axis proceeds away from the x-axis, and the frequency can be increasing along the x-axis as the x-axis proceeds away from the y-axis.

The exemplary graphs 400 also include a graph 414 that presents a fifth plot of data points 416 of the Q factor (along the y-axis) of the electrical circuit, which has conductive fill components in proximity to the transmission line, as a function of frequency (along the x-axis); and a sixth plot of data points 418 of the other example electrical circuit, which contains no conductive fill components, as a function of frequency. As depicted in the graph 408, the Q factor values can be increasing (incr.) along the y-axis as y-axis proceeds away from the x-axis, and the frequency can be increasing along the x-axis as the x-axis proceeds away from the y-axis.

As can be observed from the exemplary graphs 400, the series resistance (R) of the electrical circuit, which contains the conductive fill components (and does not contain physical resistors for resistive stabilization of the electrical circuit), can desirably increase at higher frequencies, while remaining lower for a lower range of frequencies, and while the series inductance (L) of the electrical circuit, which contains the conductive fill components, can desirably remain substantially the same, even at higher frequencies. Thus, the conductive fill components in proximity to the transmission line can act as a resistive stabilizer for the electrical circuit at higher frequencies, without the electrical circuit having to employ a physical resistor, and such electrical circuit, employing the conductive fill components, can have a series resistance (R) that can increase at higher frequencies (e.g., increase only at higher frequencies), while maintaining or substantially maintaining a desired inductance value. Further, since the effect of the conductive fill components is only at higher frequencies, DC gain for the electrical circuit, employing the conductive fill components, can be desirably maintained (e.g., kept) at the same or substantially same DC gain value, which is unlike electrical circuits that utilize physical resistors for resistive stabilization, as such physical resistors can undesirably (e.g., unwantedly, inefficiently, sub-optimally, or otherwise undesirably) can alter DC gain at all frequencies.

Figure 5:
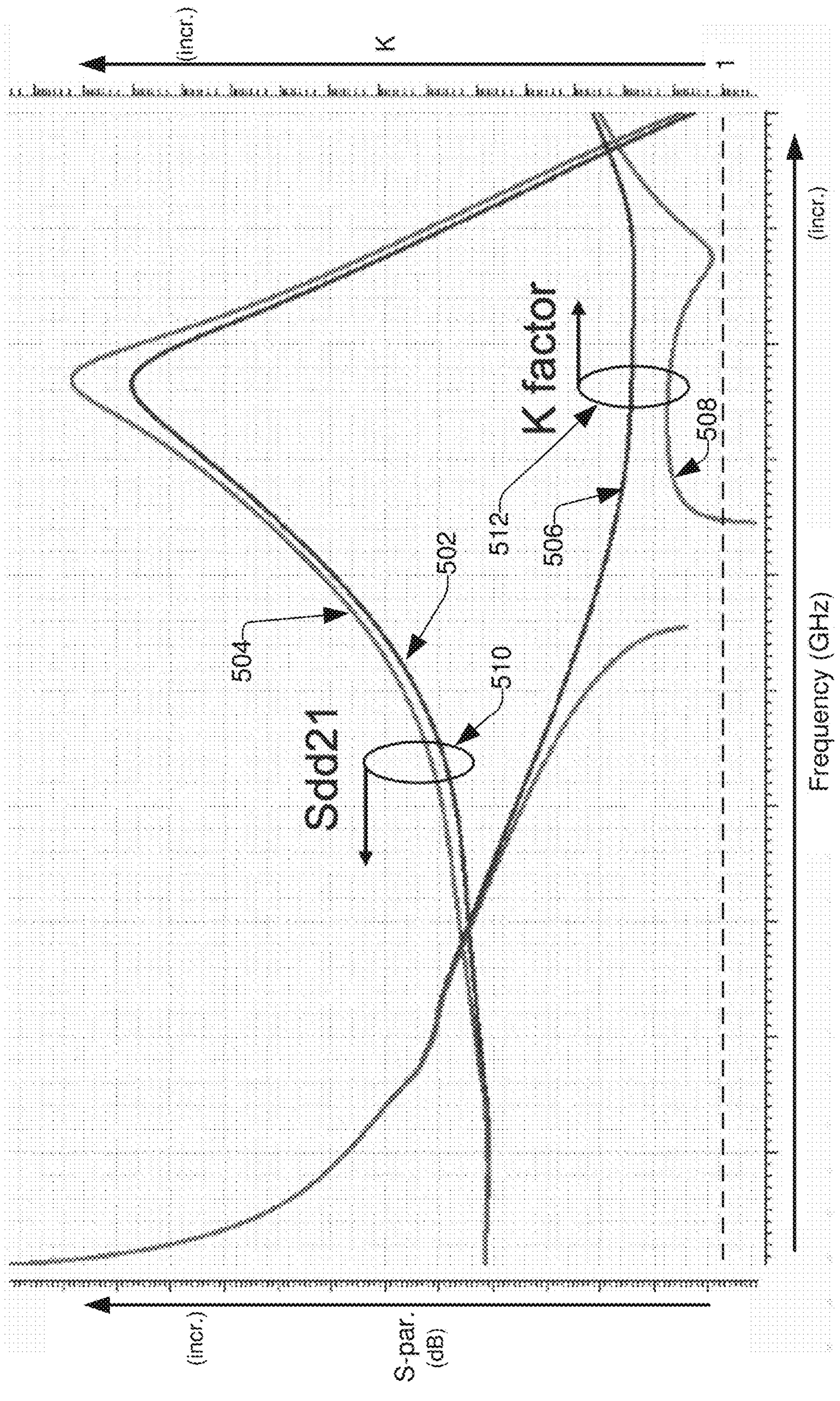
FIG. 5 illustrates a diagram of a non-limiting exemplary graph of experimental results (e.g., EM simulation results) relating to S-parameters (S-par.) and a K factor in connection with employing conductive fill components with a transmission line (e.g., MLIN) in an electrical circuit, comprising a driver, wherein the conductive fill components can provide desirable stabilization for the electrical circuit and associated driver, in accordance with various aspects and embodiments of the disclosed subject matter.

Referring briefly to FIG. 5, FIG. 5 illustrates a diagram of a non-limiting exemplary graph 500 of experimental results (e.g., EM simulation results) relating to S-parameters (S-par.) in dB and a K factor (a stability factor that can represent or indicate stability of the electrical circuit) in connection with employing conductive fill components with (e.g., in proximity to) a transmission line (e.g., MLIN) in an electrical circuit, comprising a driver, wherein the conductive fill components can provide desirable (e.g., suitable, enhanced, or optimal) stabilization for the electrical circuit and associated driver (e.g., without the electrical circuit containing physical resistors for resistive stabilization of the electrical circuit), in accordance with various aspects and embodiments of the disclosed subject matter. The example transmission line is a metal MLIN. The experimental simulation is at an example temperature of −5° Celsius for the example circuit with the conductive fill components, and for the other example circuit with no conductive fill components.

The exemplary graph 500 presents a first plot of data points 502 of dB values for S-parameters (in dB) (along the (first) y-axis) of the example electrical circuit, which has conductive fill components in proximity to the transmission line (e.g., with the electrical circuit not containing physical resistors for resistive stabilization of the electrical circuit), as a function of frequency (in GHz) (along the x-axis); and a second plot of data points 504 of dB values for S-parameters of the other example electrical circuit, which contains no conductive fill components, as a function of frequency. The exemplary graph 500 also presents a third plot of data points 506 of the K factor (along the (second) y-axis) of the electrical circuit, which has conductive fill components in proximity to the transmission line, as a function of frequency (along the x-axis); and a fourth plot of data points 508 of the K factor of the other example electrical circuit, which contains no conductive fill components, as a function of frequency. As depicted in the graph 500, the S-parameters values and the K factor values each can be increasing (incr.) along the y-axis as y-axis proceeds away from the x-axis, and the frequency can be increasing (incr.) along the x-axis as the x-axis proceeds away from the y-axis (e.g., the (first) y-axis associated with the S-parameters).

As can be observed from the graph 500, the differential-to-differential $S_{21}$ ($S_{dd21}$) parameter with respect to the $S_{21}$ parameter of the electrical circuit (with conductive fill components) and the $S_{21}$ parameter of the other electrical circuit (with no conductive fill components) is desirably relatively small (e.g., relatively minimal) (as indicated at reference numeral 510). As also can be observed from the graph 500, the other electrical circuit (with no conductive fill components) can become undesirably unstable, having a K factor of less than 1, at some higher frequencies, whereas, in contrast, the electrical circuit (with conductive fill components) can desirably remain stabilized at all frequencies (e.g., can have a K factor at or greater than 1), including higher frequencies (as indicated at reference numeral 512).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 6:
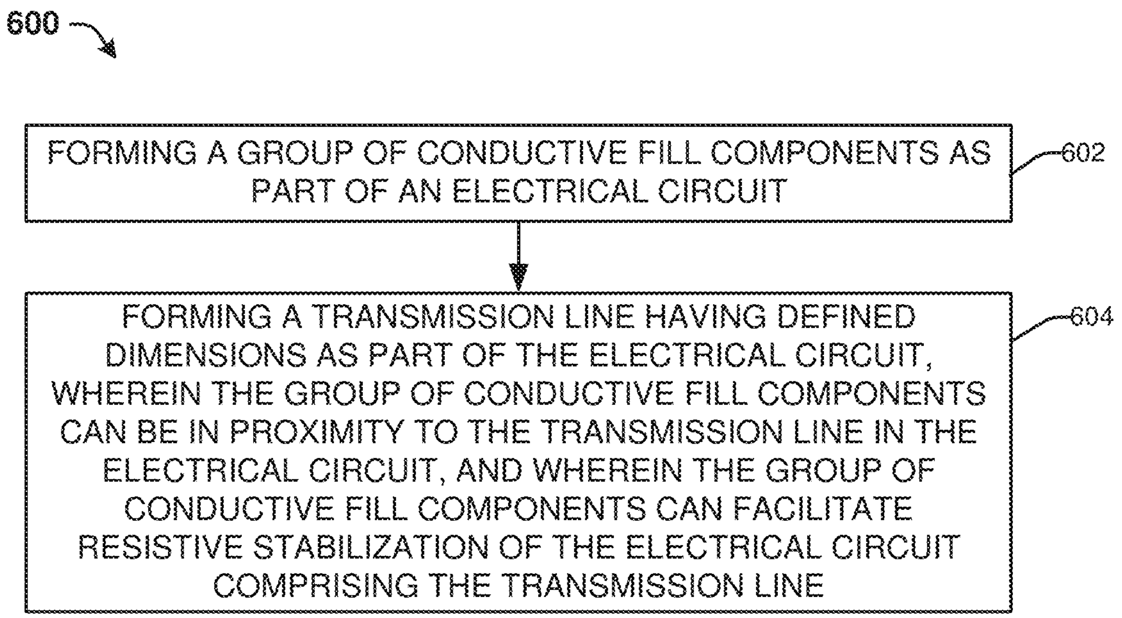
FIG. 6 illustrates a flow chart of an example method that can employ a group of conductive fill components that can desirably facilitate or provide resistive stabilization and other desirable circuit qualities or characteristics in an electrical circuit, comprising one or more transmission lines, without having to use a physical resistor in the electrical circuit, in accordance with various aspects and embodiments of the disclosed subject matter.
Figure 7:
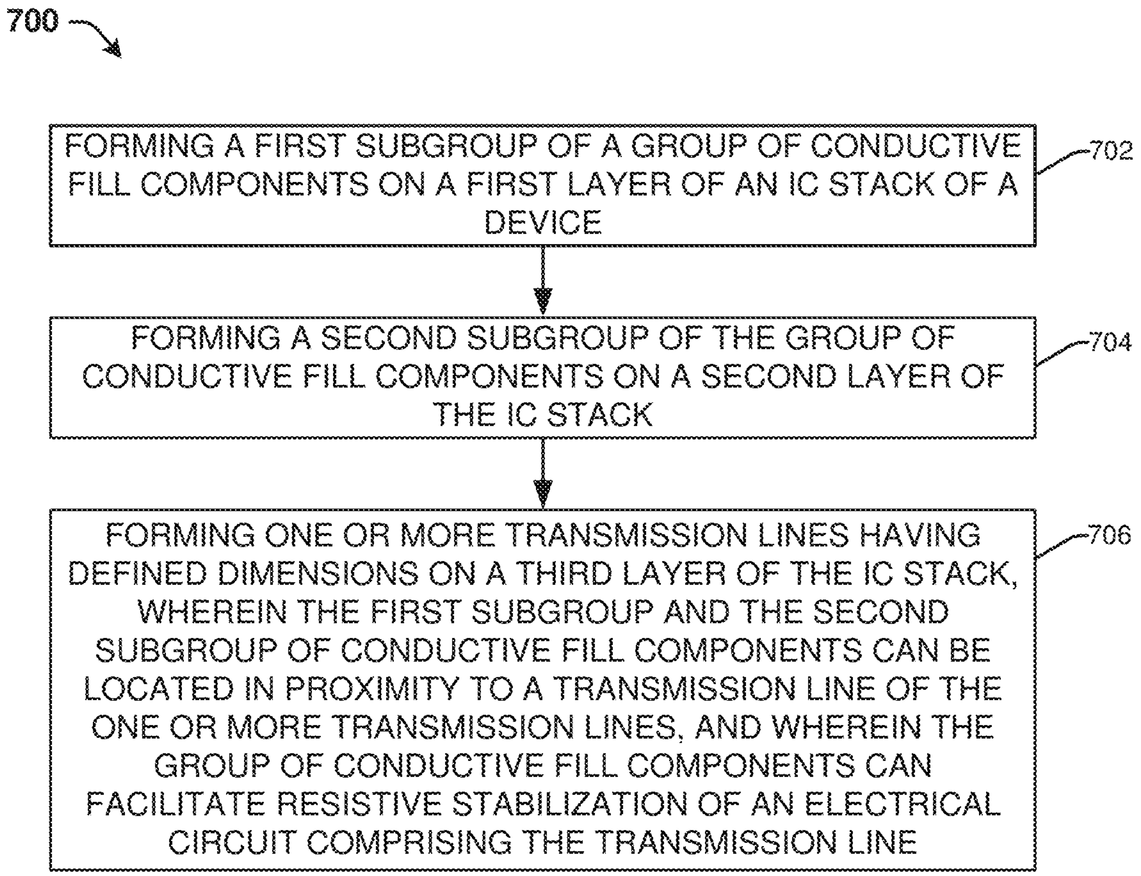
FIG. 7 depicts a flow chart of another example method that can employ a group of conductive fill components, across multiple layers of an electrical circuit (e.g., of an IC stack of layers of the electrical circuit), where the group of conductive fill components can desirably facilitate or provide resistive stabilization and other desirable circuit qualities or characteristics in the electrical circuit, comprising one or more transmission lines, without having to use a physical resistor in the electrical circuit, in accordance with various aspects and embodiments of the disclosed subject matter.

In view of the example systems and/or devices described herein, example methods that can be implemented in accordance with the disclosed subject matter can be further appreciated with reference to flowcharts in FIGS. 6-7. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 6 illustrates a flow chart of an example method 600 that can employ a group of conductive fill components that can desirably (e.g., suitably, acceptably, enhancedly, or optimally) facilitate or provide resistive stabilization and other desirable circuit qualities or characteristics in an electrical circuit, comprising one or more transmission lines, without having to use a physical resistor in the electrical circuit, in accordance with various aspects and embodiments of the disclosed subject matter. The method 600 can be employed in connection with a system or device comprising a transmission line, the group of conductive fill components, and/or other electrical components or circuitry. In some embodiments, a device formation component can be employed to form, fabricate, or create the transmission line, the group of conductive fill components, and/or other electrical components or circuitry.

At 602, a group of conductive fill components can be formed as part of an electrical circuit. For example, the device formation component can form, fabricate, or create the group of conductive fill components on or as part of one or more other layers of an IC stack of layers (e.g., IC stack comprising respective layers on which respective components of the electrical circuit(s) can be formed) that can form one or more electrical circuits, including the electrical circuit, of a device, such as described herein.

At 604, a transmission line having defined dimensions can be formed as part of the electrical circuit, wherein the group of conductive fill components can be in proximity to the transmission line in the electrical circuit, and wherein the group of conductive fill components can facilitate resistive stabilization of the electrical circuit comprising the transmission line. For instance, the device formation component can form, fabricate, or create the transmission line having the desired dimensions as part of a layer of the IC stack of the device, such as described herein. The group of conductive fill components can be formed such that, when the transmission line is formed, the group of conductive fill components can be located (e.g., positioned or situated) in desired proximity (e.g., with a defined distance of) the transmission line, such as described herein. It is to be appreciated and understood that, while a transmission line is described with regard to the method 600, in some embodiments, the electrical circuit can comprise multiple transmission lines.

FIG. 7 depicts a flow chart of another example method 700 that can employ a group of conductive fill components, across multiple layers of an electrical circuit (e.g., of an IC stack of layers of the electrical circuit), where the group of conductive fill components can desirably (e.g., suitably, acceptably, enhancedly, or optimally) facilitate or provide resistive stabilization and other desirable circuit qualities or characteristics in the electrical circuit, comprising one or more transmission lines, without having to use a physical resistor in the electrical circuit, in accordance with various aspects and embodiments of the disclosed subject matter. The method 700 can be employed in connection with a system or device comprising a transmission line, the group of conductive fill components, and/or other electrical components or circuitry. In some embodiments, a device formation component can be employed to form, fabricate, or create the transmission line, the group of conductive fill components, and/or other electrical components or circuitry.

At 702, a first subgroup of a group of conductive fill components can be formed on a first layer of an IC stack of a device. At 704, a second subgroup of the group of conductive fill components can be formed on a second layer of the IC stack. At 706, one or more transmission lines having defined dimensions can be formed on a third layer of the IC stack, wherein the first subgroup and the second subgroup of conductive fill components can be located in proximity to a transmission line of the one or more transmission lines, and wherein the group of conductive fill components can facilitate resistive stabilization of an electrical circuit comprising the transmission line.

For example, the device formation component can form, fabricate, or create the first subgroup of conductive fill components on the first layer of the IC stack (e.g., IC stack comprising respective layers on which respective components of an electrical circuit(s) can be formed) of the device (e.g., electrical or electronic device), the second subgroup of conductive fill components on the second layer of the IC stack, and/or another subgroup(s) of the group of conductive fill components on another layer(s) of the IC stack, such as described herein. The device formation component also can form, fabricate, or create the one or more transmission lines having the desired dimensions as part of a third layer of the IC stack of the device, such as described herein. The respective subgroups (e.g., first subgroup, second subgroup, and/or other subgroup) of the group of conductive fill components can be formed such that, when the transmission line is formed, the group of conductive fill components can be located (e.g., positioned or situated) in desired proximity (e.g., with a defined distance of) the transmission line, such as described herein.

With further regard to the method 600 of FIG. 6 and the method 700 of FIG. 7, it is to be appreciated and understood that, while formation of the transmission line(s) is recited after formation of the group of conductive fill components, in some embodiments, the group of conductive fill components can be formed after the transmission line(s) is formed, and the respective operations of the method 600 and the method 700 can be performed in a different order than presented above. For instance, in accordance with the method 600 and/or the method 700, the transmission line(s) can be formed on a layer of the IC chip stack, and the group of conductive fill components can be formed on one or more other layers (e.g., one or more different layers) of the IC chip stack.

Figure 8:
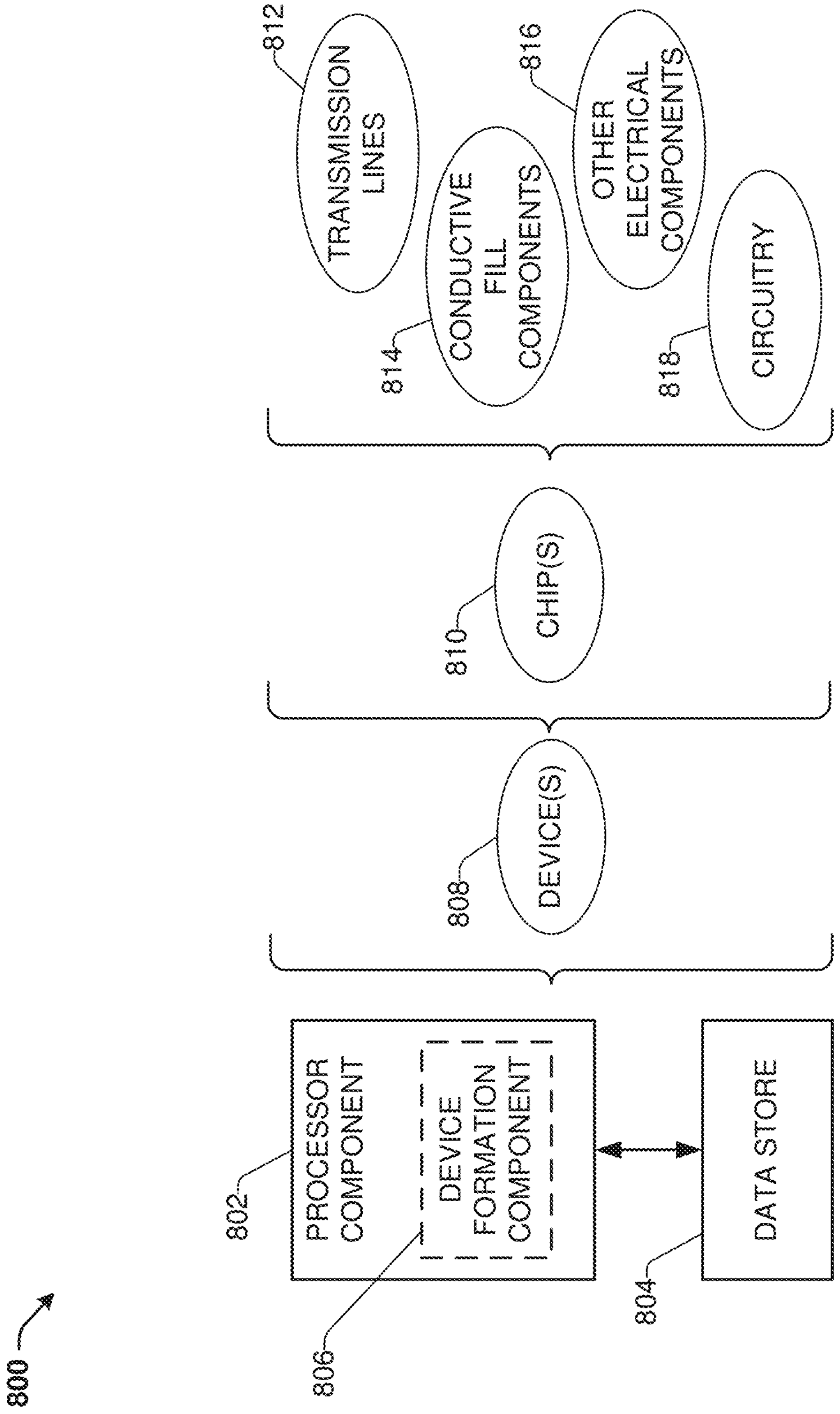
FIG. 8 depicts a block diagram of an example system that can be utilized to create, form, or design a device comprising transmission lines, conductive fill components, ground components, and/or other components, elements, or circuitry, in accordance with various aspects and embodiments of the disclosed subject matter.

FIG. 8 depicts a block diagram of an example system 800 that can be utilized to create, form, or design a device comprising transmission lines, conductive fill components, ground components, and/or other components, elements, or circuitry, in accordance with various aspects and embodiments of the disclosed subject matter. The system 800 can comprise a processor component 802 and a data store 804. In accordance with various embodiments, the processor component 802 can comprise or be associated with (e.g., communicatively connected to) a device formation component 806 that can be utilized to create, form, or design various components of or associated with a device 808 (or a system comprising one or more devices), including transmission lines, conductive fill components, ground components, and/or other components, elements, or circuitry, such as more fully described herein. For instance, the device formation component 806 can be utilized to create, form, or design the various components of a device 808 (or a system) that can be formed or situated on one or more chips 810 (e.g., IC chip(s)). The various components can comprise, for example, transmission lines 812, conductive fill components 814, other electrical components 816, and/or associated circuitry 818 of an electrical circuit(s) of the device 808.

As part of and to facilitate creating, forming, or designing the various components of or associated with a device 808, the device formation component 806 can form or process substrates. Also, as part of and to facilitate creating, forming, or designing the various components and/or circuitry of or associated with the device 808, the device formation component 806 also can form, deposit, remove (e.g., selectively remove or etch), pattern, or process materials, including silicon or silicon-based materials (e.g., dielectric and/or insulator materials), silicon germanium (SiGe), gallium arsenide (GaAs), gallium nitride (GaN), indium phosphide (InP), or other materials (e.g., semiconductor materials) that can offer or allow for multiple metal layers, conductive materials (e.g., copper-based material, indium-based material, or other desired conductive material), or other materials of the device 808. For example, the device formation component 806 can employ and/or can control various processes, including fabrication processes, microfabrication processes, nanofabrication processes, SiGe semiconductor processes, GaAs semiconductor processes, GaN semiconductor processes, InP semiconductor processes, complementary metal-oxide-semiconductor (CMOS) processes, silicon on insulator (SOI) processes, other type of semiconductor process, material deposition processes (e.g., a low pressure chemical vapor deposition (LPCVD) process), masking or photoresist processes, photolithography processes, chemical etching processes (e.g., reactive-ion etching (RIE) process, a potassium hydroxide (KOH) etching process), other etching or removal processes, epitaxial processes, material straining processes, patterning processes, planarization processes (e.g., chemical-mechanical planarization (CMP) process), component formation processes, and/or other desired processes to desirably form, deposit, remove (e.g., selectively remove or etch), pattern, or process materials to facilitate creating or forming the respective components or circuitry of the device 808.

The processor component 802 can work in conjunction with the other components (e.g., the data store 804, the device formation component 806, or another component) to facilitate performing the various functions of the system 800. The processor component 802 can employ one or more processors, microprocessors, or controllers that can process data, such as information relating to designing, creating, or forming transmission lines 812, conductive fill components 814, other electrical components 816, other components or devices, and/or associated circuitry 818 of the electrical circuit(s), and information relating to circuit design criteria, circuit design algorithms, traffic flows, policies, protocols, interfaces, tools, and/or other information, to facilitate operation of the system 800, as more fully disclosed herein, and control data flow between the system 800 and other components (e.g., computer components, computer, laptop computer, other computing or communication device, or network device) associated with (e.g., connected to) the system 800.

The data store 804 can store data structures (e.g., user data, metadata), code structure(s) (e.g., modules, objects, hashes, classes, procedures) or instructions, information relating to designing, creating, or forming transmission lines 812, conductive fill components 814, other electrical components 816, other components or devices, and/or associated circuitry 818 of the electrical circuit(s), and information relating to circuit design criteria, circuit design algorithms, traffic flows, policies, protocols, interfaces, tools, and/or other information, to facilitate controlling operations associated with the system 800. In an aspect, the processor component 802 can be functionally coupled (e.g., through a memory bus) to the data store 804 in order to store and retrieve information desired to operate and/or confer functionality, at least in part, to the data store 804, the device formation component 806, or other component, and/or substantially any other operational aspects of the system 800. The data store 804 described herein can comprise volatile memory and/or nonvolatile memory, such as described herein.

Figure 9:
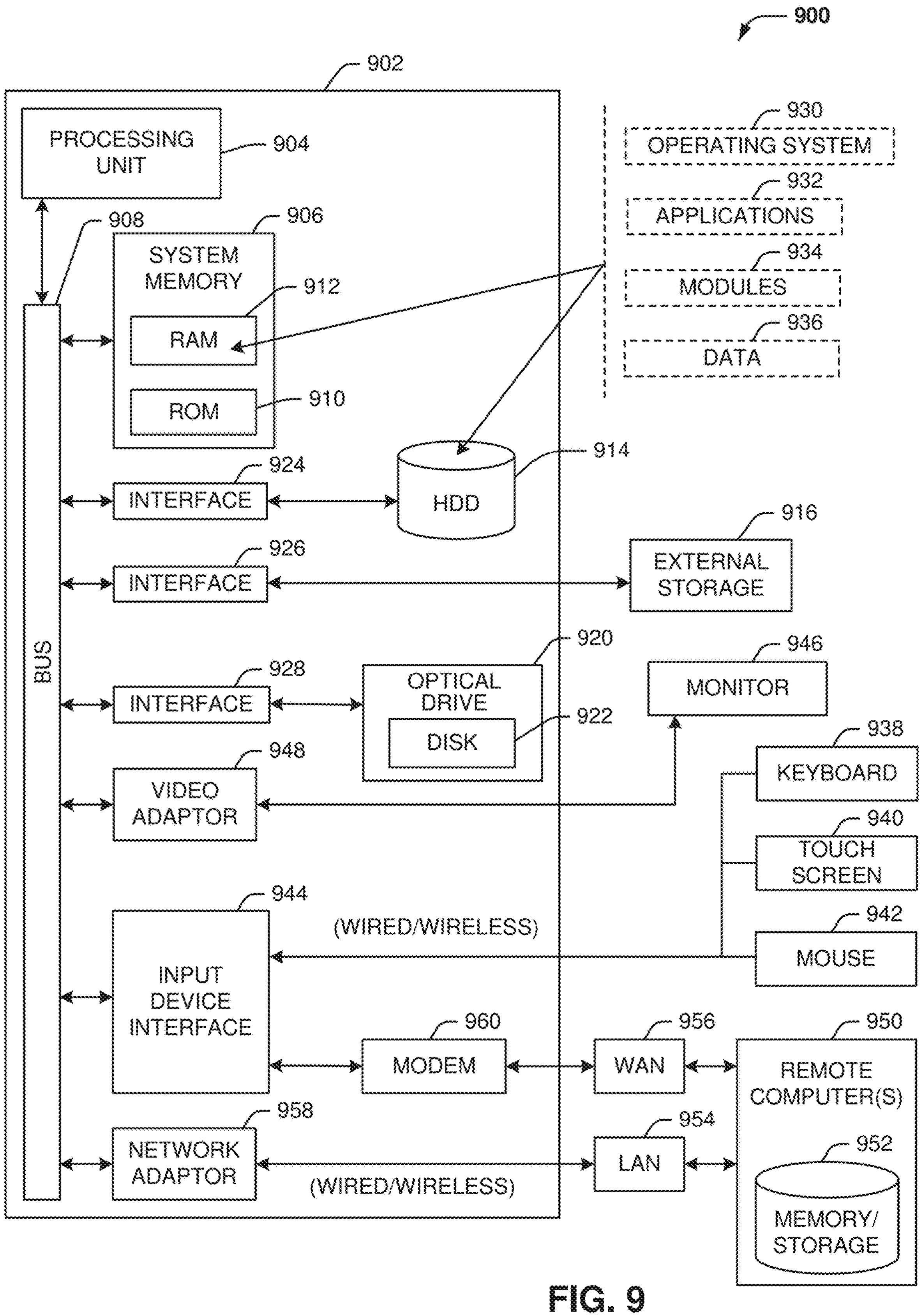
FIG. 9 illustrates an example block diagram of an example computing environment in which the various embodiments of the embodiments described herein can be implemented.

In order to provide additional context for various embodiments described herein, FIG. 9 and the following discussion are intended to provide a brief, general description of a suitable computing environment 900 in which the various embodiments of the embodiments described herein can be implemented. The computing environment 900 can be utilized, for example, to design, create, form, or fabricate a device (e.g., electrical or electronic device) comprising transmission lines, conductive fill components, ground components, and/or other electrical or electronic components, elements, or circuitry, such as described herein, in accordance with various aspects and embodiments of the disclosed subject matter. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, or other type of machine-related information, that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which terms are used herein differently from one another as follows. Computer-readable storage media or machine-readable storage media can be any available storage media that can be accessed by the computer and includes both volatile and nonvolatile media, removable and non-removable media. By way of example, and not as a limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, or other type of external storage device) and an optical disk drive 920 (e.g., which can read or write from a CD-ROM disc, a DVD, a BD, or other type of optical disk drive 922). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often wire/wirelessly connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, or other type of interface.

A monitor 946 or other type of display device can be also connected to the system bus 908 via an interface, such as a video adapter 948. In addition to the monitor 946, a computer typically includes other peripheral output devices (not shown), such as speakers, printers, or other type of peripheral output device.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956, e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, or other equipment or location), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like can refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, or other component) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus (ses), controllers, I/O interface, address registers, and so on. It is to be appreciated that some overlap in definitions is anticipated, and an architecture or a system can be a stand-alone component, or a component of another architecture, system, device, or structure.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips, or other type of magnetic storage device), optical disks (e.g., compact disk (CD), digital versatile disk (DVD), or other type of optical disk), smart cards, and flash memory devices (e.g., card, stick, key drive, or other type of flash memory device). Computer-readable transport media can include carrier waves, or the like. Of course, those skilled in the art will recognize many modifications can be made to this configuration without departing from the scope or spirit of the disclosed subject matter.

What has been described above includes examples of the disclosed subject matter. It is, of course, not possible to describe every conceivable combination of components or methods for purposes of describing the disclosed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system that facilitates resistive stabilization of an electrical circuit, comprising:

a transmission line having defined dimensions; and a group of conductive fill components in proximity to the transmission line, wherein the group of conductive fill components provides the resistive stabilization of the electrical circuit comprising the transmission line, wherein the group of conductive fill components comprises a first conductive fill component and a second conductive fill component that is adjacent to and separated from the first conductive fill component by a gap of a defined size between the first conductive fill component and the second conductive fill component, wherein the first conductive fill component and the second conductive fill component are not in contact with each other, and wherein the first conductive fill component and the second conductive fill component are formed of a conductive material.

2. The system of claim 1, wherein the first conductive fill component and the second conductive fill component form at least a portion of at least one of a first subgroup of conductive fill components in proximity to a first side of the transmission line, a second subgroup of conductive fill components in proximity to a second side of the transmission line, and a third subgroup of conductive fill components in proximity to a third side of the transmission line.

3. The system of claim 2, further comprising a ground plane that extends to a first region in proximity to the first side of the transmission line, a second region in proximity to the second side of the transmission line, or a third region in proximity to the third side of the transmission line.

4. The system of claim 1, wherein the transmission line is a microstrip line having the defined dimensions comprising a width on an order of micrometers.

5. The system of claim 1, wherein the first conductive fill component and the second conductive fill component form at least a portion of at least one of a first layer of first conductive fill components in proximity to the transmission line and a second layer of second conductive fill components in proximity to the first layer of the first conductive fill components, and wherein the first layer of the first conductive fill components is situated between the transmission line and the second layer of the second conductive fill components.

6. The system of claim 5, wherein the first conductive fill components of the first layer have first dimensions, and wherein the second conductive fill components of the second layer have second dimensions, in accordance with defined circuit design criteria relating to first characteristics of the group of conductive fill components or second characteristics of the electrical circuit.

7. The system of claim 1, wherein the resistive stabilization of the electrical circuit is a function of respective dimensions of the first conductive fill component and the second conductive fill component of the group of conductive fill components, respective conductive materials of the first conductive fill component and the second conductive fill component, the defined size of the gap between the first conductive fill component and the second conductive fill component, a number of layers of the group of conductive fill components, or respective locations of the first conductive fill component and the second conductive fill component in relation to the transmission line.

8. The system of claim 1, wherein, based on a group of characteristics of the group of conductive fill components, and based on the group of conductive fill components being located in proximity to the transmission line, an inductance of the electrical circuit is substantially same over a defined range of frequencies associated with the electrical circuit.

9. The system of claim 1, wherein, based on a group of characteristics of the group of conductive fill components, and based on the group of conductive fill components being located in proximity to the transmission line, a series resistance of the electrical circuit is substantially the same over a defined range of lower frequencies associated with the electrical circuit, and, at higher frequencies above the defined range of lower frequencies, the series resistance increases to higher series resistances as a function of an increase in frequency of the higher frequencies, and wherein the higher series resistances are higher in resistance than the series resistance.

10. A method that facilitates resistive stabilization of an electrical circuit, comprising:

forming a transmission line having defined dimensions; and forming a group of conductive fill components in proximity to the transmission line, wherein the group of conductive fill components facilitates the resistive stabilization of the electrical circuit comprising the transmission line, wherein the group of conductive fill components comprises a first conductive fill component and a second conductive fill component that is adjacent to and separated from the first conductive fill component by a gap of a defined size between the first conductive fill component and the second conductive fill component, wherein the first conductive fill component and the second conductive fill component are not in contact with each other, and wherein the first conductive fill component and the second conductive fill component are formed of a conductive material.

11. The method of claim 10, wherein the first conductive fill component and the second conductive fill component form at least a portion of at least one of a first subgroup of conductive fill components in proximity to a first side of the transmission line, a second subgroup of conductive fill components in proximity to a second side of the transmission line, and a third subgroup of conductive fill components in proximity to a third side of the transmission line; and wherein a ground plane is in proximity to the group of conductive fill components or the transmission line, and wherein the ground plane extends to a first region in proximity to the first side of the transmission line, a second region in proximity to the second side of the transmission line, or a third region in proximity to the third side of the transmission line.

12. A device that facilitates resistive stabilization of an electronic circuit, comprising:

a conductive line having defined dimensions; and a group of conductive fill elements within a defined distance of the conductive line, wherein the group of conductive fill elements enables the resistive stabilization of the electronic circuit comprising the conductive line, wherein the group of conductive fill elements comprises a first conductive fill element and a second conductive fill element, wherein the second conductive fill element is adjacent to and separated from the first conductive fill element by a space of a defined size between the first conductive fill element and the second conductive fill element, wherein the first conductive fill element and the second conductive fill element are not in contact with each other, and wherein the first conductive fill element and the second conductive fill element are formed of a conductive material.

13. The device of claim 12, wherein the first conductive fill element and the second conductive fill element form at least a portion of at least one of a first subgroup of conductive fill elements within the defined distance of a first side of the conductive line, a second subgroup of conductive fill elements within the defined distance of a second side of the conductive line, and a third subgroup of conductive fill elements within the defined distance of a third side of the conductive line.

14. The device of claim 13, further comprising a ground component that extends to a first region in proximity to the first side of the conductive line, a second region in proximity to the second side of the conductive line, or a third region in proximity to the third side of the conductive line.

15. The device of claim 12, wherein the first conductive fill element and the second conductive fill element form at least a portion of at least one of a first layer of first conductive fill elements within the defined distance of the conductive line, and a second layer of second conductive fill elements within the defined distance of the first layer of the first conductive fill elements, and wherein the first layer of the first conductive fill elements is situated between the conductive line and the second layer of the second conductive fill elements.

16. The device of claim 15, wherein the first conductive fill elements of the first layer have first dimensions, and wherein the second conductive fill elements of the second layer have second dimensions, in accordance with a defined design rule relating to first attributes of the group of conductive fill elements or second attributes of the electronic circuit.

17. The device of claim 12, wherein the resistive stabilization of the electronic circuit is a function of respective characteristics of respective conductive fill elements of the group of conductive fill elements.

18. The device of claim 12, wherein, based on a group of characteristics of the group of conductive fill elements, and based on the group of conductive fill elements being located in proximity to the conductive line, an amount of capacitance associated with the electronic circuit increases as a function of an increase in a frequency associated with the electronic circuit.

19. The device of claim 12, wherein, based on a group of characteristics of the group of conductive fill elements, and based on the group of conductive fill elements being located in proximity to the conductive line, a series resistance of the electronic circuit is substantially the same over a defined range of lower frequencies associated with the electronic circuit, and, at higher frequencies above the defined range of lower frequencies, the series resistance increases to higher series resistances as a function of an increase in frequency of the higher frequencies, and wherein the higher series resistances are higher in resistance than the series resistance.

20. The device of claim 12, wherein the conductive line is a microstrip line having the defined dimensions comprising a width on an order of micrometers.

* * * * *